Sept. 30, 1958  D. J. DE MICHELE  2,854,646
STRAIN GAGE
Filed June 30, 1954
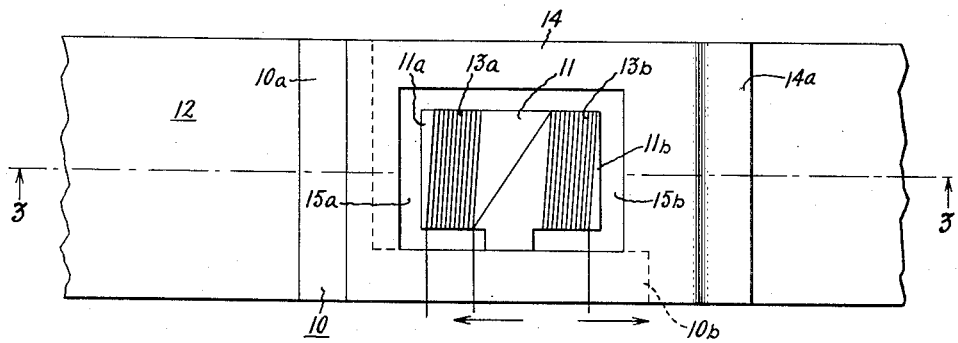
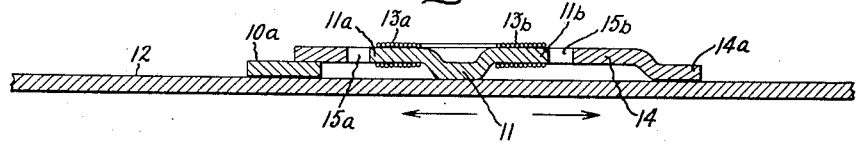
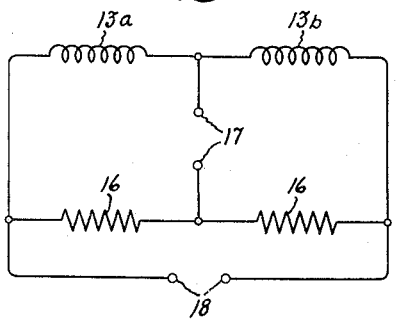
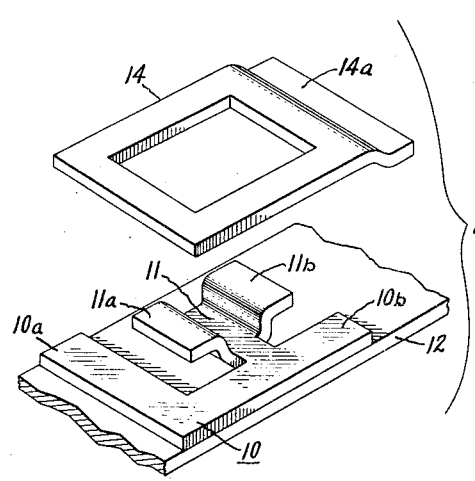
Inventor:
Dominick J. DeMichele,
by Merton D Morse
His Attorney.

United States Patent Office 2,854,646
Patented Sept. 30, 1958

2,854,646

STRAIN GAGE

Dominick J. De Michele, Schenectady, N. Y., assignor to General Electric Company, a corporation of New York Application June 30, 1954, Serial No. 440,455

2 Claims. (Cl. 336—30)

This invention relates to electric strain gages, and more particularly to an improved strain gage of the variable inductance type.

An object of the invention is to provide an improved strain gage that embodies a high degree of sensitivity and accuracy, but is nevertheless inexpensive and easily fabricated.

Another object is to provide a variable inductance type of strain gage that embodies two variable width air gaps, but retains the simplicity of construction generally associated with a gage having a single air gap.

Another object is to provide a strain gage for the measurement of both static and dynamic strains that embodies temperature compensating means and has a high degree of stability, so that the gage does not drift and will return to its original zero point when the object to which it is attached is returned to its initial condition of strain.

A further object is to provide a strain gage that is suitable for use at high temperatures.

One form of variable inductance strain gage constructed in accordance with the invention comprises a magnetic core having a portion for attachment to an object whose strain is to be measured, and a portion spaced from the object with a plurality of coils wound on the spaced portion. A frame-like armature is also secured to the object in flux-linking relationship to the coils, and, as the object to which the gage is attached is strained, the width of the air gaps between the coils and the armature varies, one gap becoming narrower and another gap becoming wider. The changes in air gap widths vary the reluctances of the magnetic circuits and hence change the inductances of the coils. The strain gage may be connected in a conventional alternating current bridge circuit, whereby, as the inductances of the coils are varied by stress applied to the object, the bridge circuit is unbalanced and an output signal is produced whose amplitude is proportional to the strain of the object.

The novel features which I believe to be characteristic of my invention are set forth with particularity in the appended claims. My invention itself, both as to its organization and method of operation, together with further objects and advantages thereof, may best be understood by reference to the following description taken in conjunction with the accompanying drawing, in which Fig. 1 is an exploded perspective view of the strain gage of the invention without coils thereon;

Fig. 2 is a plan view of the assembled gage;

Fig. 3 is a sectional view taken on the line 3—3 of Fig. 1; and

Fig. 4 is a diagram of a typical bridge circuit in which the strain gage of the invention may be utilized.

Referring now to Fig. 1, the strain gage there shown comprises a core having an L-shaped supporting portion 10 with arms 10a and 10b and a T-shaped portion 11 that may be made integral with arm 10b of the supporting portion or attached at its base thereto. Arm 10a of the L-shaped portion may be attached to an object 12 subject to strain. The T-shaped portion 11 of the core is formed with its arms 11a and 11b lying in a plane spaced from the plane of the supporting portion 10 of the core and extending along the object 11 in the direction in which force will be applied. Thus, the portion 11 is cradle-shaped in longitudinal cross-section through the arms, which are preferably of similar configuration. Because of ease of construction, it is preferred that the L-shaped portion 10 and the T-shaped portion 11 are integrally constructed of magnetic material, although only the T-shaped portion is required to have magnetic properties. Of course, the supporting portion 10 need not be L-shaped, but may be of any desired configuration. In some instances, it may be eliminated entirely, and the portion 11 attached directly to the object 12.

Referring now to Fig. 2, the arms 11a and 11b of the core have similar coils 13a and 13b, respectively, wound thereon. When the gage is assembled, the arms and the coils are surrounded by a frame-like armature 14 constructed of magnetic material, which has an end portion 14a that may be secured to the object 12 spaced from the point where the supporting member 10 is secured to the object, in the direction in which force will be applied. As best seen in Fig. 3, the end portion 14a is offset from the remainder of the armature so that, when it is secured to the object 12, the remainder of the armature lies substantially in the same plane as the arms 11a and 11b of the core with its unsecured end portion in sliding engagement with the supporting portion 10 of the core. Thus, there is provided an air gap 15a between the end of the arm 11a and the armature, and a similar air gap 15b exists between the end of the arm 11b and the armature. It is seen that the core and armature are of simple construction, and may be manufactured rapidly and inexpensively by modern punching methods. In addition, the gage embodies two air gaps, and yet is characterized by the simplicity usually associated with single gap gages.

When the coils 13a and 13b are energized by an alternating current, magnetic flux flows through the T-shaped portion 11 of the core and through the frame-like armature 14 that surrounds the T-shaped portion, as is apparent to one skilled in the art. The reluctance of the magnetic path and hence the self-inductances of the two coils depends on the widths of the air gaps 15a and 15b between the ends of the arms of the T-shaped portion of the core and the armature. Thus, when the air gaps are of equal width, the coils have equal inductances, which is normally the condition when the object 12 is in an unstrained state. Thereafter, if the object 12 is subject to compressive or tensional stress in the direction indicated by the arrows in Figs. 1 and 2, relative motion occurs between the armature 14 and the core 10, and the width of one of the air gaps 15a and 15b decreases and the width of the other air gap increases. Consequently, the inductance of one of the coils 13a and 13b increases while the inductance of the other coil decreases, and the changes in inductances are a measure of the strain occurring in the object.

Because the strain gage of the invention is constructed especially for use at high temperatures, the materials from which the core and armature are formed must be selected with due regard for the Curie points of the materials. As is known to those skilled in the art, the Curie point of a metal is that temperature above which the metal becomes paramagnetic and loses many of those properties that make it suitable for use in the present application. Therefore, the metals selected for the core and armature should have Curie points above the temperature range in which the gage will be used. AISI 416 stainless steel, which has a Curie point at approximately 600° C., has been found well suited to this use. Various other metals such as cold rolled ingot iron strip and silicon steel are also suitable, and the invention is in no way limited to the use of any particular metal or metals. The core and armature may be constructed from the same or different materials, as desired.

It is desirable that the wire composing the coils 13a and 13b have low resistance and high inductance. It has been found that copper wire, either unplated or nickel plated to reduce oxidation, has these desirable properties. Various types of wire may be used, however, and the invention is not limited to the use of copper wire. Of course, the coil must be insulated from the core on which it is wound, and the turns of the coil must be insulated from each other. This may be done by various means, for example, by coating the wire of the coil with a ceramic insulation, such as that known commercially as Cercc, available from the Sprague Electric Company, or by coating the wire with P-1 cement, manufactured by the Allen Cement Company. It is pointed out that certain insulators become conducting at high temperature, and, therefore, care must be used in selecting the insulator for the wire of the coils to insure that it does not become conducting within the temperature range in which the gage will be used.

The strain gage elements may be attached to the object 12 by a suitable cement or other means so that the gage may be removed from the object after the measurements have been completed and no permanent disfiguring of the object will result. Among others, No. 31 cement, manufactured by Sauereisen Cement Company, Pittsburgh, Pa., may be used for this purpose.

The strain gage illustrated in Figs. 1, 2, and 3 may be utilized in a conventional alternating current bridge circuit, such as that shown diagrammatically in Fig. 4, although the gage of the invention is not limited to use in any particular circuit. Two adjacent arms of the bridge may comprise like resistances 16, and the other two arms may comprise the coils 13a and 13b. A pair of opposite bridge points are connected to input terminals 17 and the remaining pair of opposite bridge points are connected to output terminals 18. Of course, the bridge input and output terminals are interchangeable.

When a source of alternating current is connected to the bridge input terminals 17, and the core 10 and the armature 14 are so mounted relative to each other that when the object 12 is in an unstrained condition the air gaps 15a and 15b are equal, the inductances of the coils 13a and 13b are equal and the bridge is balanced. Thus, no output signal appears at terminals 18. Then, if the object 12 is subjected to tensional or compressive stress, the inductances of the coils 13a and 13b change and the impedance of one of the arms of the bridge increases while the impedance of the corresponding arm in the opposite side of the bridge decreases. Thus, the bridge is unbalanced and an output signal appears at terminals 18.

When the double gap strain gage of the invention is utilized in a conventional A. C. bridge circuit, such as is shown in Fig. 4, the amplitude of the output signal is directly proportional to the strain of the object to which the gage is attached. Thus, the output signal may be connected into an A. C. voltmeter or other indicator (not shown), and the indicator may be calibrated directly in terms of strain. Alternatively, appropriate charts may be used to convert from amplitude values to strain.

It is apparent that there is a 180° phase difference between the output signals resulting from tensional and compressive forces, which will not be apparent from the reading of an indicator such as an A. C. voltmeter connected to the bridge output terminals. However, the type of force to which the object is subjected is generally known, and, therefore, the phase of the output signal is of little or no consequence.

The points at which the core and the armature are secured to the object subject to strain are spaced apart in the direction which force will be exerted on the object. Thus, it is apparent that the strain gage of the invention is responsive primarily to tensional or compressive stress or to such components of other types of stress. For example, a bending stress would be apt to cause an erroneous response from the gage, and hence the gage is most useful in those cases where the stress is purely of tensional or compressive type. It may be used in other applications, of course, but care must be exercised in interpreting the results of such use.

The strain gage of the invention may be made in various sizes and is particularly well suited to being constructed in a miniature form. In the case of the miniature gage, the core and the armature may be constructed of lamination material of the order of a few thousandths of an inch thick. The complete gage may be approximately 1" long and .75" wide, and the width of the air gaps may be approximately .002" when the object to which the gage is attached is in an unstrained condition.

It is now apparent that the present invention provides a strain gage that attains the objectives set forth, and which fills a needed place in the art. The strain gage of the invention inherently embodies a high degree of sensitivity, because when the object to which it is attached is subjected to stress, the width of one of the air gaps decreases while the other increases. The gage is of simple construction and, while embodying the advantages of a double gap gage, is of a two-piece construction generally associated with a single gap gage. The core and armature are particularly well suited to being mass produced by punching methods.

The gage of the invention is capable of accurately measuring static as well as dynamic strains, because if the frequency of the energizing current is constant, the inductances of the coils depend only on the widths of their respective air gaps. Both coils of the gage may be assumed to be operating at the same temperature and if the coils are connected in opposite sides of a bridge circuit automatic temperature compensation is effected without the use of additional elements. Thus, the gage has a high degree of stability, and it will return to its original zero point within small limits, when the object to which it is attached is returned to its original condition of strain.

The gage of the invention is useable at temperatures ranging up to approximately 1000° F. and is limited in this respect only by the Curie points of the materials of the core and armature and by temperature limitations inherent in the wire of the coils and in the cements used to insulate the coils and to cement the gage to the object. In addition, the gage of the invention is suitable for field installation, and may be attached to and removed from an object without causing any permanent disfigurement of the object.

While I have shown a particular embodiment of my invention, it will, of course, be understood that many modifications may be made and I contemplate by the appended claims to cover any such modifications as fall within the true spirit and scope of my invention.

What I claim as new and desire to secure by Letters Patent of the United States is:

1. A strain gage comprising a core and an armature each of which is of substantially the same thickness and formed from a single magnetic lamination, said core and armature in assembled relationship each having a support portion for attachment by cement to an object subject to strain at points spaced from one another in the direction in which force is applied to said object, said core having a T-shaped coil supporting portion the arms of which extend in the direction of said force and are spaced from said object by the thickness of said support portion of said core and the base of which is attached to said support portion of said core, and said armature having a frame-like portion which is spaced from said object by the thickness of said support portion of said core on which it rests in sliding engagement and which surrounds and is spaced by air gaps from the ends of said arms of said T-shaped coil supporting portion of said core, and a coil mounted on each arm of said T-shaped coil supporting portion of said core, said coils having turns insulated from one another and from said arms.

2. A strain gage comprising a core and an armature each of which is of substantially the same thickness and formed from a single magnetic lamination, said core and armature in assembled relationship each having a support portion for attachment by cement to an object subject to strain at points spaced from one another in the direction in which force is applied to said object, said core having a raised portion spaced from said object by the thickness of said support portion of said core to which it is attached, and said armature having a frame-like portion which surrounds said raised portion of said core and is spaced from said object by the thickness of said support portion of said core on which it rests in sliding engagement, said core and armature being spaced from one another by air gaps on opposite sides of said raised portion of said core at the ends of arms extending in the direction of said force and forming a part of said core and armature structure lying in the same plane, and a coil mounted on each of said arms and having turns insulated from one another and from said arm on which it is mounted.

References Cited in the file of this patent

UNITED STATES PATENTS

| | | |
|---|---|---|
| 2,466,382 | Coake | Apr. 5, 1949 |
| 2,576,488 | Stovall | Nov. 27, 1951 |
| 2,632,149 | Baker | Mar. 17, 1953 |
| 2,672,048 | Ruge | Mar. 16, 1954 |